Patented July 21, 1936

2,047,987

UNITED STATES PATENT OFFICE 2,047,987

LOW TEMPERATURE PREPARATION OF RUBBER HYDROHALIDES

Herbert A. Winkelmann, Chicago, Ill., assignor, by mesne assignments, to Marbo Patents Inc., a corporation of Delaware No Drawing. Application June 17, 1935, Serial No. 27,050

8 Claims. (Cl. 260—1)

This invention relates to the preparation of butadiene of diolefine hydrohalides and their derivatives, and more particularly to the preparation of rubber hydrochlorides. It includes the preparation of thin transparent flexible sheet material therefrom, especially adapted for wrapping purposes.

It has been proposed to make transparent sheet material by dissolving rubber in benzene or chloroform and passing hydrogen chloride gas into the solution at around room temperature. The films made from the reaction product are not as clear and colorless as desirable for many purposes, and in particular are hazy. Although the haze may be removed, it has hitherto required special means such as calendering of the sheets, involving considerable extra expense and trouble.

An object of this invention is to produce films of rubber hydrochloride of superior clarity and transparency which are highly resistant to oils and moisture.

Another object is to produce a clear, transparent, oil and water resistant wrapping sheet.

A further object is to produce especially pure rubber hydrochloride solutions suitable for coating and casting into clear films.

Another object is to eliminate the after treatment for removal of haze from rubber hydrochloride sheets.

Another object is to produce rubber hydrochlorides quickly and economically.

Other objects will become apparent from reading the specification.

The exact mechanism of the action of hydrogen halides on rubber is not definitely known, but it is believed that there is some slight polymerizing taking place as well as addition of hydrogen chloride to the rubber molecule, and also that the proteins which are always present in rubber, and practically impossible to entirely remove, also react with the hydrogen chloride. These various side reactions are detrimental to the clarity of films made from the solutions. Among the other factors entering into the difference in flexibility and clarity of films is the difference in crystal structure of the rubber hydrochlorides made under various conditions. Another factor in the formation of haze is the rate of gelation. Still another factor is the presence of water. Excess acid also has an effect.

The present invention, broadly, is reacting rubber with hydrogen halides at temperatures substantially below room temperatures, viz. $-15°$ C., and preferably reacting rubber solutions saturated with hydrogen chloride at low temperatures for a sufficient time to produce a relatively oil resistant type rubber hydrochloride, but for insufficient time to produce a very insoluble quick jelling type of rubber hydrochloride.

The use of low temperatures has been found to increase the purity of the rubber hydrochloride and the clarity of resultant film and sheets made from solutions of the rubber hydrochlorides. The reasons as to why superior flexible transparent sheets and film are obtained at low temperature than at high temperature are not definitely known. It is believed that there is a marked lessening of polymerization and side reactions at low temperatures. The difference in crystal structure obtained at low temperatures from that obtained at room temperatures may also have an effect. X-ray photography shows definitely that rubber hydrochloride made from rubber solutions are of crystalline structure. Another factor is believed to be the slow rate of gelation of rubber hydrochloride solutions made at low temperature compared with those made at or near room temperature.

The reaction at low temperature as carried out with rubber solutions and gaseous hydrogen chloride is preferably stopped soon after gelation of the solution takes place at the low temperature, as this corresponds to a rubber hydrochloride which has been sufficiently reacted to be relatively insoluble and turpentine resistant, (the resistance to turpentine being the test used to measure the relative resistance of films to oils and solvents), yet not so insoluble that immediate gelation takes place at room temperature.

On stopping of the flow of gas the cold solution is allowed to immediately warm to room temperature, thereby eliminating a large portion of the excess hydrogen chloride and greatly slowing down any reaction taking place due to dissolved hydrogen chloride. Superior results from the point of view of clarity of films and sheets may also be obtained by immediately neutralizing the solution to completely stop reaction. It has been found that allowing the rubber hydrochloride solutions to remain standing in the presence of the dissolved hydrogen chloride is detrimental to clarity. The product should be made quickly, the solution warmed to room temperature and then neutralized to remove hydrochloric acid as quickly as possible. Long exposure to hydrogen chloride should be avoided, especially long exposure at elevated temperatures.

The reaction of rubber in solution with hydrogen chloride at temperatures such as around $-50°$ C. to produce clear turpentine resistant, slow jelling rubber hydrochloride is particularly advantageous since with hydrogen chloride and solid rubber at such low temperature the advantage of a non-jelling or slow jelling product is counterbalanced for many purposes by the production of a type of rubber hydrochloride which, when cast into sheets or films, is non-resistant to penetration by turpentine.

The reaction of rubber solution with hydrogen chloride at temperatures of around −20° C. is also of advantage not only from the point of view of superiority in the films made from the resulting rubber hydrochloride but in the economy of a reaction which can be carried out with maximum concentration of hydrogen chloride at not too excessive pressures for commercial operation. The discovery by applicant that the reaction of rubber with hydrogen chloride takes place quickly at low temperatures and/or around equilibrium pressures makes possible the quick and economical production of pure rubber hydrochloride.

Although the reactions with hydrogen chloride and rubber at low temperatures may be carried out with rubber in the solid or undissolved condition, the reaction and critical temperatures and pressures are slightly different than in solution, and the films produced therefrom are in general also different from the films made with the reaction of rubber solutions. Possibly this difference is due to the non-homogeneity of rubber hydrochloride made from solid rubber, but there are other factors such as differences due to physical and chemical structure, solubility and the like, of products made in solution as compared to products made in the undissolved state. The present invention, although broadly covering the reaction with solid rubber, in its preferred aspects, is concerned with the reaction in cold rubber solutions, and the production of films and sheets suitable for wrapping purposes from such solutions.

The preferred solvent is toluene, although chloroform and other rubber solvents which remain fluid at low temperatures may be used.

The following examples will illustrate the invention:

*Example I*

A 6% solution of crude pale crepe rubber in toluene is made and cooled to −78° C. Dry gaseous hydrogen chloride is passed into the cold solution for one hour. A fairly hard jell is produced. The jell is warmed to produce a sol, the excess acid immediately removed by suitable means such as neutralization with sodium carbonate, ammonia or other alkali, centrifuged or filtered and the solution cast into a thin sheet. A very clear, transparent sheet without haze is obtained. The chlorine content of the rubber hydrochloride is approximately 29%. Instead of removing the cement and neutralizing after one hour reaction, the cold cement may be stirred and allowed to react with the excess dissolved hydrogen chloride for two hours longer. A hard jell results at the low temperature which may be melted by warming to room temperature or above, neutralized and cast into clear sheets.

Similar results are attained at −50° C. and −35° C. The cements made at these temperatures even before neutralization are light yellow in color.

At −20° C., after one hour reaction, the cement does not jell, but on stirring for twenty minutes longer a hard jell forms at the low temperature. The cements made at −20° C. give clear, non-hazy films or sheets.

At 0° C. after one hour reaction the cement does not jell. The solution is light red in color. Additional stirring does not cause gelation. Sheets produced from the neutralized cement are fairly clear, but slightly soft. By passing in hydrogen chloride gas for an additional hour a hard jell is formed which cannot be sufficiently melted on warming to cast into sheets except by diluting with additional toluene. The sheets produced therefrom are slightly cloudy or hazy, but better than those made at around room temperature.

At room temperature (20° C.) after one, two and three hours reaction there is no gel formation. On casting the resulting solution into sheets a rubbery film is obtained in each case. Reaction for twelve hours gives a markedly darker solution, a cloudy or hazy film is obtained therefrom which is definitely inferior in transparency to film made at below 5° C.

*Example II*

A 6% solution of rubber in toluene is reacted with hydrogen chloride at −50° C. under the approximately equilibrium pressure of 70 lb. per square inch until a gel is formed. On warming to a sol, neutralizing immediately with sodium carbonate, centrifuging, casting and drying, there is produced clear, non-hazy sheets having a chlorine content on the basis of the rubber hydrochloride of about 30%.

Similar results are obtained at −50°, −35° and −20° C., with definitely less satisfactory results as the temperature goes above −10° C.

*Example III*

Sheets of rubber of about .02" thickness are directly exposed to gaseous hydrogen chloride at equilibrium pressure for one hour at −20° C. The chlorine content of the resulting product is 30.5%. The product in its undissolved state is washed and neutralized to remove excess hydrogen chloride and protein reaction products, dissolved in benzol at room temperature and cast into a film. A clear product is obtained which is highly resistant to turpentine.

With solid rubber, clear turpentine resistant films are obtained by reacting the rubber with hydrogen chloride to about 29–31% chlorine content at temperatures above −35° C. at within 50% of equilibrium pressure for a period of time not greatly in excess of three hours. For casting or coating from solutions the reaction should be carried out not so long as to give the benzol insoluble product which has a chlorine content of about 34%. As with rubber in solution, increasing the temperatures gives darker colored products and faster jelling products of equal chlorine content. Due to the greater ease with which hydrogen chloride escapes from the solid sheets than from solution, immediate neutralization is not so important. This, as well as other factors, makes the production of film or sheets by reacting hydrogen chloride with solid rubber a different problem than with rubber solutions. However, in general, it is preferred to carry out the process with solid rubber as with dissolved rubber at temperatures below 5° C., but unlike dissolved rubber, turpentine non-resistant products result as the temperature goes below −50° C. with solid rubber.

It is to be understood that numerous details may be varied throughout a wide range without departing from the principle of this invention and it is, therefore, not intended to limit the patent granted hereon otherwise than necessitated by the prior art. It is difficult to state the exact transition point for temperature, chlorine content and time of reaction which gives the preferred product of the invention.

The temperature ranges, however, may be divided into three groups:

1. +5° C. to —10° C., in which range there is an appreciable decrease in time of reaction, and a slight increase in clarity of the resultant films, but not a marked increase in clarity over films made with rubber hydrochloride produced at around room temperature such as 10° C. to 30° C.

2. —10° C. to —35° C., in which range there is a marked decrease in the time of reaction and increase in clarity of the resultant films. This is the preferred commercial working range.

3. Below —35° C., in which range the solubility of rubber hydrochloride made with solid rubber is greatly increased, especially when liquefied hydrogen chloride is used, but in which range rubber hydrochloride made in solutions are not noticeably affected in solubility although there is a further increase in clarity of films made with this rubber hydrochloride, whether or not produced in the solid or dissolved state.

For the preparation of the best preferred non-hazy sheet or film of rubber hydrochloride the reaction of rubber and hydrogen chloride should be carried out:

(1) With rubber solutions (2) Below —10° C. and as much lower as practical (3) For a time such that on tests, samples of the solutions of rubber hydrochloride in toluene or benzol can be cast and dried without gelation taking place during the drying operation.

(4) With removal of dissolved hydrogen chloride by warming and neutralization or otherwise to stop further reaction as soon as the desired product is obtained, avoiding allowing the solutions to stand at room temperature in the presence of acid.

The chlorine content required to give a rubber hydrochloride which will not jell during the drying operation will vary, depending on the temperature at which the reaction is carried out, and is, therefore, not a sufficiently accurate measure in itself for purposes of definition. The chlorine content in general should range, however, from about 29 to 31%.

By the term rubber it is meant to include scrap and reclaim, vulcanized rubber and equivalent materials such as balata and gutta percha. However, for the production of clear, transparent sheets or films the rubber should preferably be as colorless as possible, such as, for example a pale crepe rubber.

I claim:

1. The method of hydrohalogenating rubber which comprises reacting a hydrogen halide and rubber in solution in a solvent at a temperature below 5° C.

2. The method of hydrochlorinating rubber which comprises reacting hydrogen chloride and rubber in solution in a solvent at a temperature below 5° C.

3. The method of hydrochlorinating rubber which comprises reacting hydrogen chloride and rubber in solution in a solvent at a temperature below —10° C.

4. The method of hydrochlorinating rubber which comprises reacting hydrogen chloride and rubber in solution in a solvent at a temperature below —35° C.

5. The method of hydrochlorinating rubber which comprises reacting hydrogen chloride and rubber in solution in a solvent at a temperature of between approximately —10° C. and —35° C.

6. The method of hydrochlorinating rubber which comprises dissolving rubber in a solvent of a type which will form a solution capable of remaining fluid at temperatures attained during the hydrochlorination, cooling the solution to a temperature below 5° C. and introducing hydrogen chloride into the cooled solution to obtain a reaction product which in thin film form is substantially unaffected by turpentine, and characterized by clarity and transparency.

7. The method of producing rubber hydrochloride which comprises reacting rubber with hydrogen chloride at a temperature between approximately —20° C. and —35° C.

8. The method of producing rubber hydrochloride which comprises reacting rubber with hydrogen chloride at a temperature between approximately +5° C. and —35° C.

HERBERT A. WINKELMANN.